United States Patent [19]

Hapgood

[11] 4,158,386
[45] Jun. 19, 1979

[54] SELF-PUMPING WATER BOILER SYSTEM

[75] Inventor: William H. Hapgood, Concord, Mass.

[73] Assignee: Raytheon Company, Lexington, Mass.

[21] Appl. No.: 829,102

[22] Filed: Aug. 29, 1977

Related U.S. Application Data

[60] Continuation of Ser. No. 593,160, Jul. 3, 1975, which is a division of Ser. No. 475,725, Jun. 3, 1974, which is a continuation-in-part of Ser. No. 49,645, Jun. 25, 1970, which is a division of Ser. No. 10,334, Feb. 11, 1970, Pat. No. 3,704,748, which is a continuation-in-part of Ser. No. 737,135, Jun. 14, 1968, abandoned, which is a continuation-in-part of Ser. No. 700,192, Jan. 24, 1968, abandoned.

[51] Int. Cl.² ............................................ F25B 29/00
[52] U.S. Cl. ................................. 165/48 R; 126/101; 237/16; 237/19; 122/343; 122/33
[58] Field of Search ........................ 165/165, 48, 59; 122/33, 367 PF, 367 R, 235 R, 343; 237/7, 19, 18, 17, 16; 431/328, 329; 126/101

[56] References Cited

U.S. PATENT DOCUMENTS

| 66,670 | 7/1867 | Bevis | 122/343 |
|---|---|---|---|
| 2,070,182 | 2/1937 | Saathoff | 122/33 |
| 2,789,769 | 4/1957 | Dalin | 237/17 |
| 3,277,956 | 10/1966 | Hughes et al. | 165/64 |
| 3,302,705 | 2/1967 | Witten, Jr. | 122/235 R |
| 3,315,646 | 4/1967 | Witten, Jr. | 122/235 R |
| 3,627,031 | 12/1971 | Ware | 165/48 X |

FOREIGN PATENT DOCUMENTS 1303016 7/1962 France ............................ 122/343

Primary Examiner—Albert W. Davis, Jr.
Attorney, Agent, or Firm—M. D. Bartlett; J. D. Pannone; H. W. Arnold

[57] ABSTRACT

A package heat exchange system using an expanded surface gas-fired burner to supply heat via a heat exchange coil in a dome above the extended surface heat exchanger which heats domestic hot water and supplies heat via the dome to a radiator for heating a living area of a home. A control system provides for utilizing steam from the extended surface heat exchanger to heat the coil in the dome and maintains a first pressure for supplying the domestic hot water and a higher pressure when radiator heat is called for. The heat for domestic hot water may be further heat transferred in a fourth heat exchanger which adjusts the temperature of the domestic hot water. The heat supplied to the radiator may be self-pumping by utilizing steam and the heat to the radiator may be cut off by supplying a control to the return pipe of the radiator which allows the radiator to fill with condensate from the steam.

7 Claims, 4 Drawing Figures

SELF-PUMPING WATER BOILER SYSTEM

CROSS REFERENCE TO RELATED APPLICATIONS

This is a streamlined continuation of application Ser. No. 593,160, filed July 3, 1975, which is a division of application Ser. No. 475,725, filed June 3, 1974, which is a continuation in part of application Ser. No. 49,645, filed June 25, 1970 by William H. Hapgood, entitled *HEAT TRANSFER STRUCTURE*, which is a division of application Ser. No. 10,334, filed Feb. 11, 1970 (now U.S. Pat. No. 3,704,748), which is a continuation in part of application Ser. No. 737,135, filed June 14, 1968 (now abandoned), which is a continuation in part of original application Ser. No. 700,192, filed Jan. 24, 1968 (now abandoned).

BACKGROUND OF THE INVENTION

Home heating systems which also supply hot water are known in which a heavy cast iron boiler has a coil immersed in a portion thereof which is used to heat domestic hot water. In such systems the hot water is that used by the system for heating the home and, as such, the temperature of the hot water is not regulated by factors other than the temperature needed for heating purposes. In addition, such heating systems utilizing, for example, a large cast iron boiler are expensive and bulky. Furthermore, such heating systems cannot be substantially entirely preplumbed at a factory since much of the piping for the heating system is positioned in the home. Ordinarily such systems are so large that they must be located inside the home, such as in the basement; otherwise, they will radiate large amounts of heat to the outside in cold weather or, alternatively, require bulky and/or expensive insulation.

SUMMARY OF THE INVENTION

In accordance with this invention, a packaged heating unit is provided which utilizes an extended surface heat exchanger with a water heating coil positioned in a dome above the heat exchanger and connections for supplying a space heating system. Further in accordance with this invention, the burner for the extended surface heat exchanger is positioned within a central plenum providing a package unit of small size which radiates low amounts of heat and thus may be positioned, for example, in a package external to a home with relatively low heat losses.

This invention further provides that the unit may be operated to maintain the temperature of the dome interior above a predetermined level thereby maintaining the entire unit above a predetermined minimum temperature, such as 100° F. As a result, when the burner starts, the flue gas produced which supplies heat to the extended surface heat exchanger will not form deposits thereon or condensation thereon since all portions of the flue gas will be above a predetermined temperature, such as 300 or 400° F., upon leaving the heat exchanger. As a result, plugging or corrosion of the extended surface heat exchanger is substantially eliminated.

This invention further provides for incorporation of the package heating unit in a heating system in which heat is supplied to a radiator which preferably is a second extended surface heat exchanger and acts as a condenser for vapor formed by the first extended surface heat exchanger. Such a system preferably eliminates the need of a circulating pump to return fluid to the first extended surface heat exchanger which acts as a boiler. Such a system preferably may be controlled by a pressure control in the dome above the boiler.

This invention provides for controlling the burner in response to the pressure of the vapor produced in the heat exchanger heated by the burner such that the burner will be actuated when the pressure falls below a predetermined value, for example, when a thermostat in a room being heated calls for heat being supplied to the radiator or water is drawn through a hot water heat exchanger heated by the vapor.

This invention further provides that the above-described systems may be utilized with a circulating pump to circulate hot water through the heat exchanger and the radiator, and if desired, the heat exchange fluid may be maintained at or below atmospheric pressure. Alternatively, when a steam of another gaseous medium is used to eliminate the circulating pump, the different hot water and the radiator heat pressures may be both below atmospheric pressure to reduce the wall thickness requirement of the heat exchangers.

This invention further provides that the radiator, boiler and hot water coil may be positioned in a package which may be located exterior to a home.

This invention further provides that the package heater hot water heat exchanger and space heating radiator may be combined with a space cooling system to form a combined hot water and environmental control system.

This invention further provides for a gaseous burner structure particularly adapted for support within a small combustion volume region such as the interior of an extended surface heat exchanger surrounding a central interior plenum which will produce substantially larger energy in a given volume than previous burner designs.

More specifically, this invention provides for a burner cylinder defining an interior plenum which is supplied with a fuel-air mixture in gaseous form by a blower. A plurality of ports in the cylinder produce jets of fuel-air mixture into the combustion area in the direction radial to the axis of the burner cylinder. The spacing of the ports from adjacent ports is sufficiently close that the flame produced from individual jets will extend across the intervening regions between the jets of fuel to produce a continuous flame front. Under these conditions, if any jet is extinguished, it will be reignited from adjacent jets. Furthermore, because the regions between the jets have an outward velocity of fuel-air mixture lower than the velocity along each of the jets, the combustion velocity rate between the jets will cause burning of the flame front to extend in toward the cylinder a greater distance than in the region directly above the axes of the jets. Under these conditions, a region of combustion adjacent the burner cylinder will continuously reignite the jet as it issues from the jet port so that a jet velocity very substantially in excess of the combustion wave velocity of the flame issues from each of the jet ports. Thus, by a continuous reignition system involving adjacent jets and low velocity regions between the jets, a very high combustion rate can be achieved. While a large size port can produce a substantial flame length and therefore accept a very substantial jet velocity without extinguishing the jet, it has heretofore required a very large combustion volume. In accordance with this invention, however, by utilizing small diameter port openings, the length of the flame may be kept very short while still burning continuously. For example, a jet velocity issuing from the burner port in excess of 400 centimeters per second may be achieved with the length of the flame extending out from the burner surface less than one inch when ports are used having a diameter of two-tenths of an inch. Accordingly, a required combustion volume for a burner cylinder two inches in diameter and six inches long can be less than a hundred cubic inches while still producing a combustion rate in excess of 100,000 BTU's per hour, or a combustion volume intensity in excess of 1,000 BTU's per hour per cubic inch of combustion volume. Also, the surface area of the burner, which preferably has a port area of between 15 and 30 percent of the total burner area, will have a combustion rate per unit surface area of the burner in excess of 5,000 BTU's per square inch per hour and/or a combustion rate in excess of 20,000 BTU's per square inch of port area per hour.

In addition, this invention provides that the fuel-air mixture may be blown through the ports from the interior of a burner wall which is thinner than the diameter of the ports. Heat absorbed by the exterior surface of the burner wall is transferred to the large volume of gas moving through the interior of the burner cylinder. In addition, due to the large velocity of the jets through the burner ports, the flame front is spaced from the burner wall and transfers relatively little heat to the burner wall by convection or conduction.

Further in accordance with this invention, the burner is preferably operated with a fuel-air mixture using, for example, 20% excess air. Under these conditions, the flame is largely nonluminous and radiates a relatively low percentage of its heat content while in the combustion region. Thus, since the burner wall is exposed to a relatively low intensity of heat radiation and absorbs relatively little heat, it may be made of nonrefractory material which is relatively easy to fabricate.

This invention further provides that such a burner having extremely large combustion rates may be combined with an extended surface heat exchanger spaced a short distance therefrom, such as a plurality of tubes interconnected by a fin or ball matrix structure, and any desired amount of heat so produced may be absorbed by the heat exchange matrix.

BRIEF DESCRIPTION OF THE DRAWINGS

Other and further objects and advantages of this invention will become apparent as the description thereof progresses, reference being had to the accompanying drawings wherein.

DESCRIPTION OF THE PREFERRED EMBODIMENT

Figure 1:
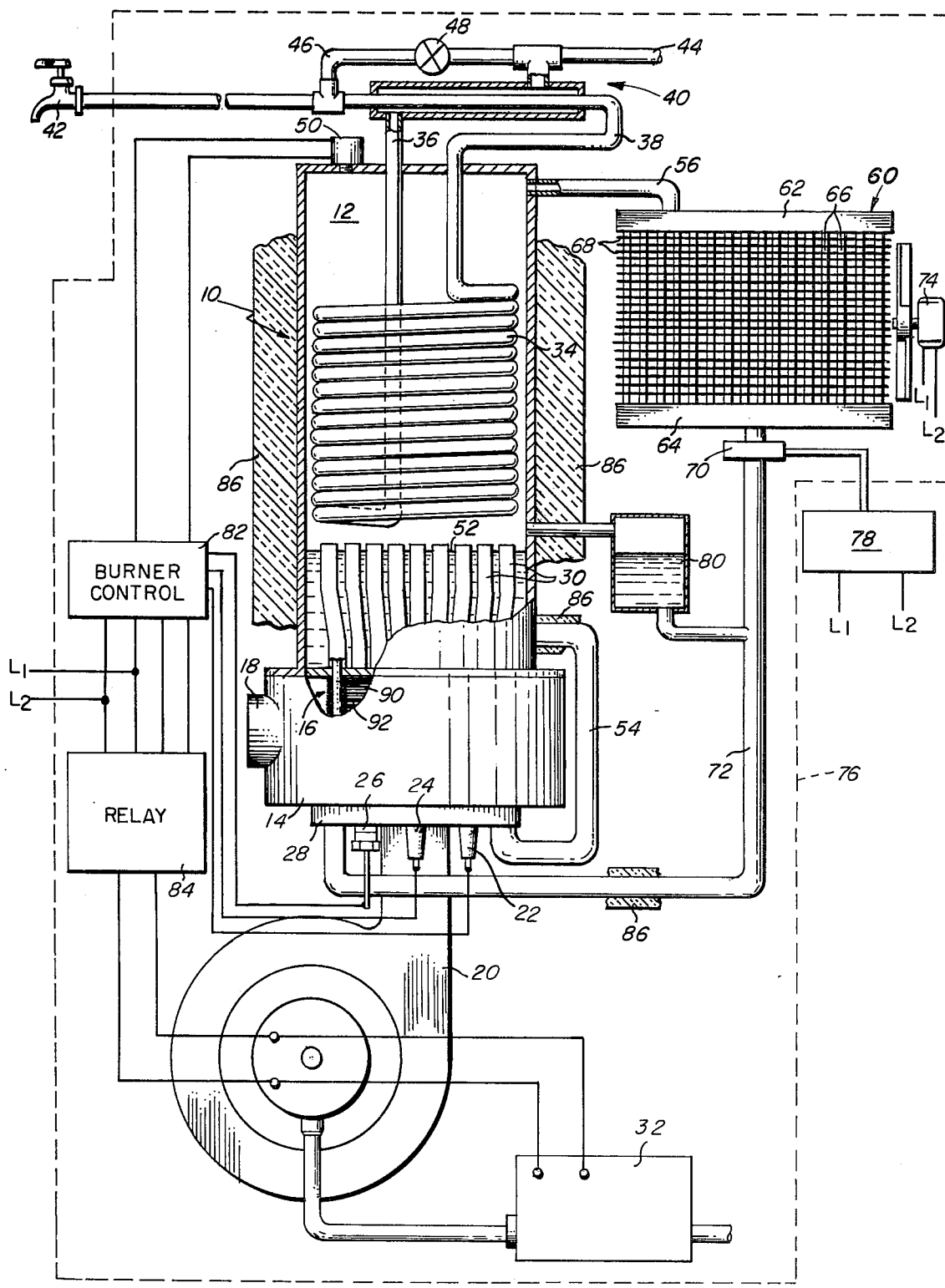
FIG. 1 illustrates a heat exchange system for supplying space heat and domestic hot water.
Figure 2:
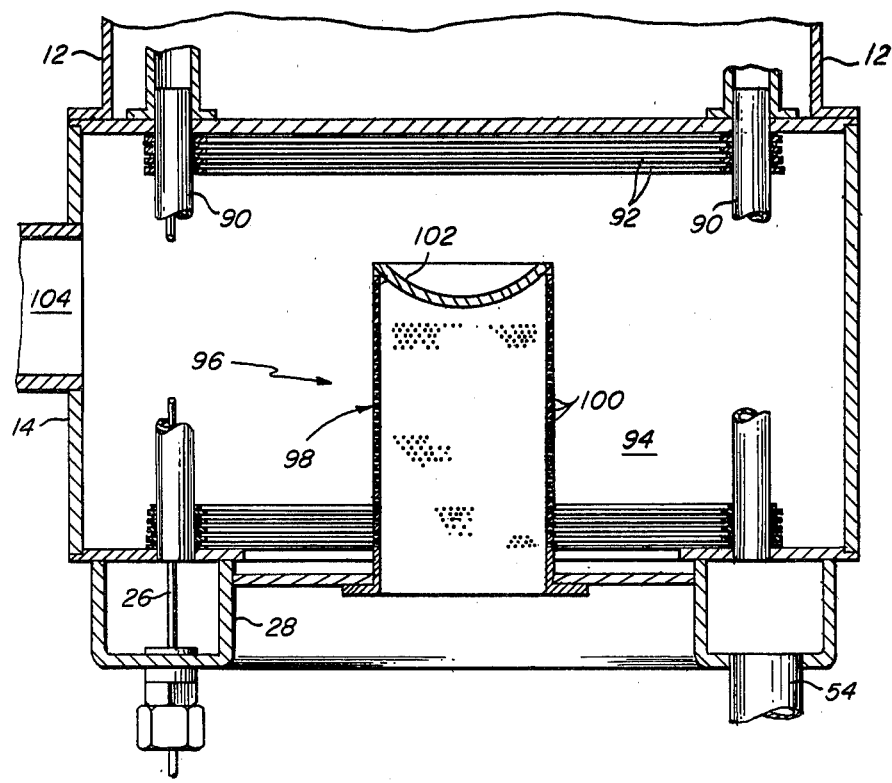
FIG. 2 illustrates a cross-sectional view of a burner heat exchange module having a finned matrix interconnecting tubes which may be used in the embodiments of FIGS. 1 and 2.
Figure 3:
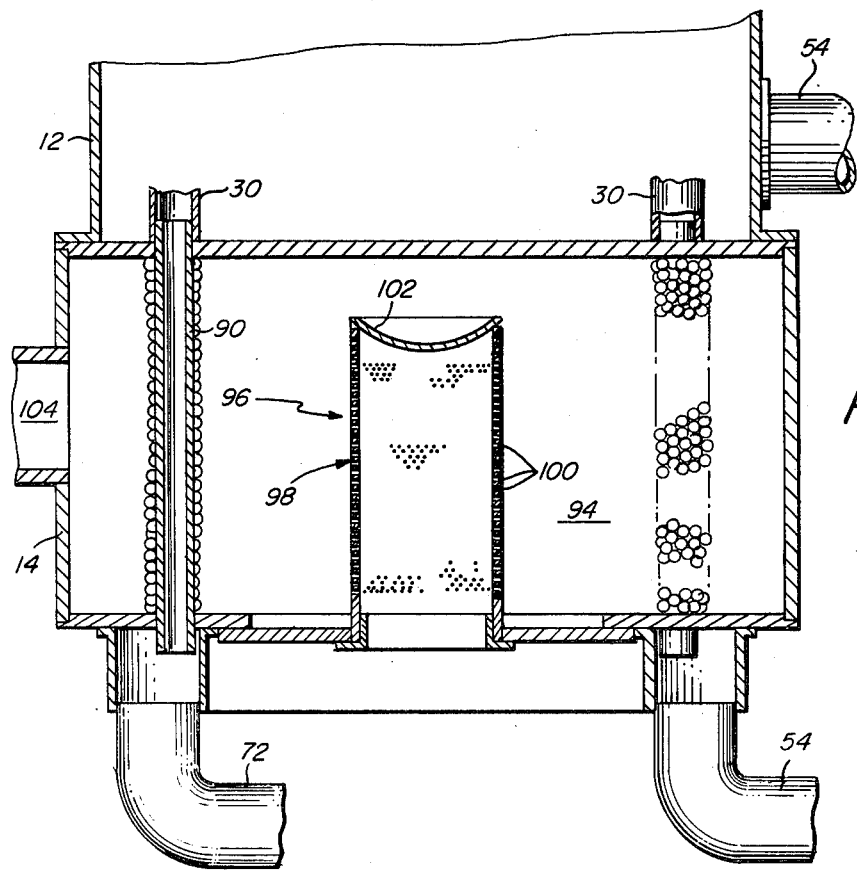
FIG. 3 illustrates an alternate embodiment of the heat exchange module illustrated in FIG. 2 with a matrix formed of a plurality of spheres bonded together and interconnecting a plurality of tubes.
Figure 4:
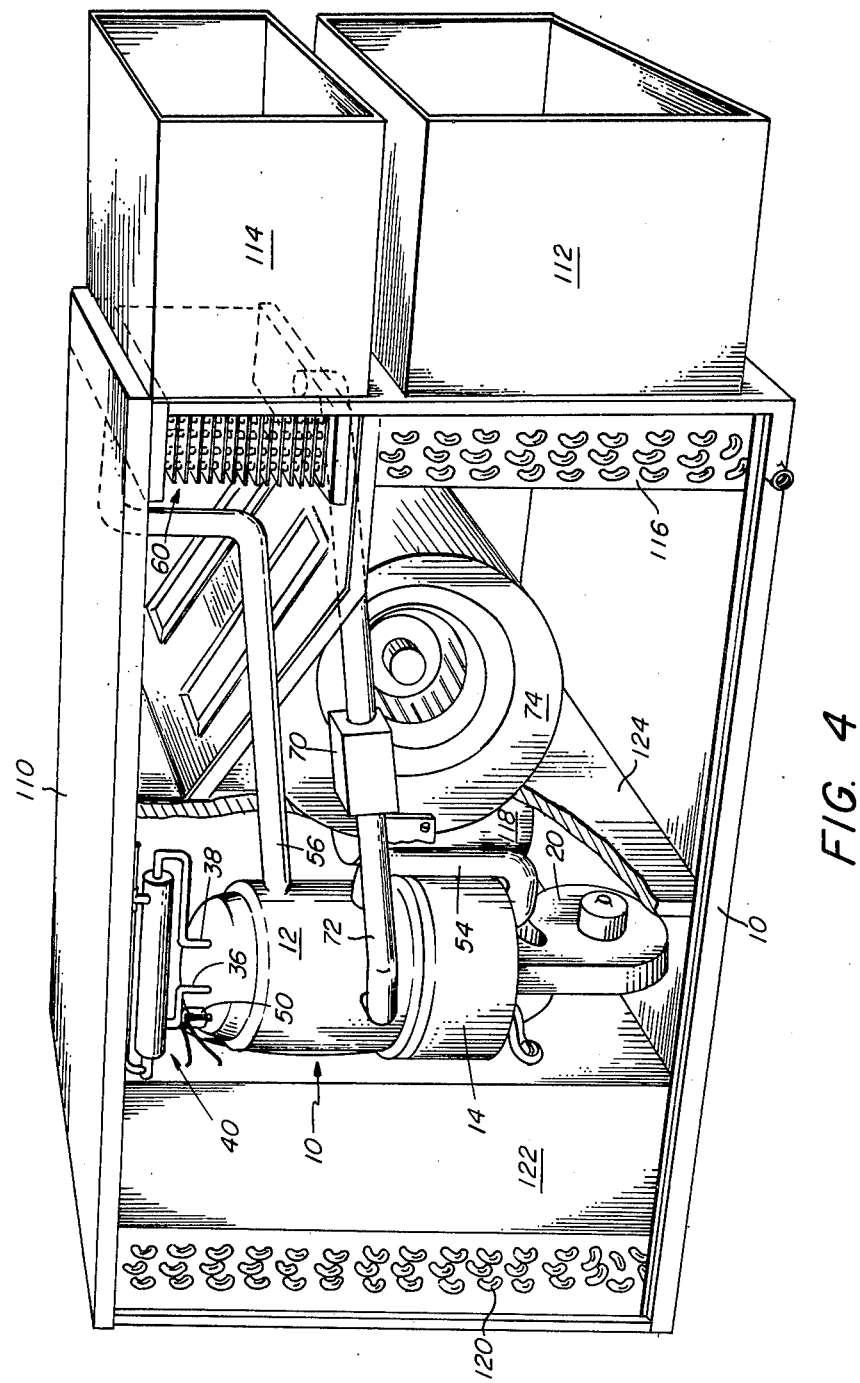
FIG. 4 illustrates a package unit embodying the structure of FIG. 1 for supplying space heating and cooling and hot water for a home.

Referring now to FIGS. 1 and 2, there is shown a steam generator system 10 comprising an outer casing whose upper portion 12 forms the shell of a steam dome and water reservoir and whose lower portion 14 forms the flue for collecting flue gas which has passed through an extended surface heat exchanger 16, for example of the types shown in FIGS. 3 or 4. The flue gas, after passing through the heat exchanger 16, exhausts through a vent 18 to an exhaust stack (not shown).

Flue gas is produced by combustion supplied to a burner inside the heat exchanger 16 by means of a blower 20 which blows a mixture of fuel and air to the burner. Ignition is supplied by an igniter 22, and the flame is sensed by a flame sensor 24. A temperature sensor 26 senses the temperature of the water in a plurality of tubes 90 extending vertically through a plurality of fins 92 of the heat exchanger 16 from a lower plenum 28 to a plurality of tube extensions 30 in the steam dome 12. Fuel is regulated to the input of the blower 20 by means of a fuel control valve and pressure regulator 32 supplied from any desired source of gaseous fuel.

Positioned above the end of tube extension 30 in steam dome 12 is a coil 34 which is supplied with water through an intake pipe 36 and supplies heated water through an outlet pipe 38 passing through a heat exchanger 40 to a domestic hot water tap 42 which is positioned at any desired point in a domestic or commercial establishment. Heat exchanger 40 supplies water from a cold water inlet 44 to the inlet pipe 36 of coil 34 so that the heated water in the outlet has a portion of the heat removed and transferred to the cooled inlet water so that the temperature of the water supplied to tap 42 will be less than the temperature of the steam in the dome 12. A bypass 46 extends from the inlet 44 to the tap 42 to mix cold water with the heated water, and the amount of such cold water is adjusted by a mixing valve 48. In such a system, by setting the valve 48 at a predetermined value, the temperature of the water at tap 42 may be set to any desired temperature below that produced by the steam in the steam dome 12.

The temperature of the steam in steam dome 12 is controlled by controlling the heat supplied to the burner, such temperature being sensed by a pressure switch 50 extending into steam dome 12 above coil 34. In operation, when such a pressure falls below a predetermined value, for example below 5 psi gauge, the blower 20 will be energized and fuel valve 32 will be turned on to supply a fuel-air mixture to the burner which is ignited by igniter 22 supplying heat through the heat exchanger 16 to heat water supplied to the lower plenum 28 producing a steam-water mixture which, being lighter than the surrounding water, moves upwardly through the tubes and through tube extensions 30 in the dome 12 to direct the steam-water mixture against the coil 34, transferring heat thereto. The steam remains in dome 12 and the water drops to the bottom of dome 12 surrounding the tubes 30 below the upper ends thereof as shown, for example, by the water level line 52, said water being returned to the lower plenum 28 through a downcomer 54 by gravity so that the lower ends of the tubes are at all times supplied with water. The steam in the upper portion of dome 12 is supplied through a steam line 56 to a radiator 60 positioned above the water level 52. Radiator 60 preferably comprises an upper header 62, a lower header 64 and a plurality of vertical tubes 66 interconnected by fins 68. The diameter of the tubes 66 is made relatively small so that the interior volume occupied by tube 66 is substantially smaller than the total volume of the water in dome 12 below the water level 52, for example, the total volume occupied by the interior of such tubes, and the lower header 64 is preferably equal to the volume occupied by one or two vertical inches of the water in dome 12. Lower header 64 is connected through a control valve 70 and a water return line 72 to the lower plenum 28 of the heating system 10. A fan 74 continuously blows air over the radiator 60 to extract heat therefrom to the surrounding air. While radiator 60 and fan 74 may be located at any desired position in a house and/or a plurality of such units may be used, preferably radiator 60 is located slightly above the level 52 of the fluid in the dome 12 in a package unit illustrated diagrammatically by the dotted line 76 which may comprise a unit suitable for mounting in the back yard of a home or on the roof of a home, with the tap 42 located exterior of the package, for example in the home. Air blown over the radiator 60 is directed into the home by ducts (not shown) connected from the package 76 to the home. The valve 70 in the water return line may be actuated, for example, by a thermostat 78 in the home to electrically open or close the valve 70.

In operation, when the thermostat 78 calls for heat, it supplies a signal to valve 70 to open valve 70, allowing water which had condensed in radiator 60 and blocked the vertical tubes 66 to drain thereby permitting steam in the upper portion of dome 12 to enter the radiator tube 66 via steam line 56 and header 62 where air blowing across the fins and tubes condenses the steam and transfers heat to the air which is circulated through the home by the blower 74 to heat the home. Under these conditions, the water level in the dome 12 is raised to approximately the level 52, slightly below the tops of the tubes 30. When sufficient heat has been supplied to the home, thermostat 78 closes valve 70 and allows additional steam supplied through pipe 56 condensing in vertical tubes 66 of the radiator 60 to fill the radiator with water thereby preventing any further steam from entering the radiator 60 and shutting off the supply of heat to the home. Under these conditions, the water level 52 is reduced by the amount of water in the radiator 60, and the level drops to a point somewhat above the top of the downcomer pipe 54. For situations where a number of radiators 60 are used so that the total fluid to fill such radiators is larger than that which can be accommodated by the change in the liquid level in dome 12, an auxiliary fluid reservoir 80 may be provided connected to the pipe 72 and vented to the dome 12. Reservoir 80 is hermetically sealed with the lower end of the reservoir being connected to the return pipe 72 and the upper end having a pressure equalizing connection to a point on the steam dome 12 above the liquid level 52. The elevation of the reservoir 80 is positioned such that it is approximately full when the liquid in the system is relatively fully expanded, that is, up to operating temperature, and is approximately empty when all the radiator 60 is full of water.

Heat insulating material 86 preferably surrounds the heater 10 including the lower portion 14 and the heat exchanger 40 as well as the return pipe 72 and the auxiliary reservoir 80 to prevent loss of heat from these surfaces thereby allowing the unit to be installed in a cold region such as a back yard or roof of a house without substantial loss of heat and/or excess use of fuel.

Pressure sensor 50 as illustrated herein maintains the pressure in the reservoir 80 within any desired pressure range by controlling the burner fed by the blower 20 via controls 82 and 84. Preferably, the pressure is relatively close to atmospheric pressure so that the thickness of metal used in the structure will be the minimum required to produce the necessary strength to satisfy the applicable boiler safety code.

Upon heat being transferred to the radiator 60 by reason of the valve 70 being opened by thermostat 78, the pressure in the dome 12 drops thereby closing the pressure switch 50 causing the burner control to actuate the blower 20 and open the blower 20 and fuel valve 32 via the relay 84 to start the burner by means of ignition electrode 22, the existence of a burner flame being monitored by the flame sensing electrode 24 in accordance with well-known practice. In the event that the system overheats, the temperature sensing electrode 26 extending into one of the tubes 30 senses the excess temperature and shuts down the burner. Such a control system is described in greater detail in the inventor's U.S. Pat. No. 3,800,747 issued Apr. 2, 1974.

In FIG. 2, there is shown an enlarged cross-sectional view of the heat exchanger 16, with a burner 96 positioned within a central plenum 94. The heat exchanger 16 is preferably formed by brazing a plurality of copper plated steel tubular members 90 to a plurality of copper plated steel annular fins 92 extending around central plenum 94.

Positioned within plenum 94 is a burner structure 96 consisting of a cylindrical wall member 98 supported from the lower header 28 in a manner similar to that described in the aforementioned patent. The wall 98 is made sufficiently thin that ports 100 formed therein will have a diameter on the same order of magnitude as, or greater than, the length of the ports 100 through the wall member 98. While the dimensions of the wall member 98 have been exaggerated in the drawings, the length of the ports through the wall member preferably should be as short as possible to reduce frictional pressure drop produced by the high velocity of the gas through the ports 100. For example, if the diameter of the burner 96 is between one and one-half and two inches, it may be formed of sheet steel having a thickness of between 0.020 inches and 0.050 inches with port diameter between 0.020 inches and 0.050 inches so that 15% to 30% of the total wall area is occupied by ports 100, and a port density of between 300 and 500 ports per square inch can be achieved. Burner 96 may be of non-refractory material such as stainless steel or, if desired, even standard cold rolled steel provided, however, that the thickness be sufficient for a given diameter for the burner to maintain a rigid fixed position during high volume firing of the burner. With such a burner, jet velocities of a fuel-air mixture supplied by the blower 20 may be made to substantially exceed the combustion wave velocity while maintaining continuous combustion in the burner. For example, a jet velocity through the ports 100 in excess of fifty feet per second, or about forty times the normal combustion wave velocity of the fuel-air mixture, can be achieved. Firing with such a velocity might be achieved through a single port several inches in diameter. The flame issuing from such a port would extend several feet and would impinge upon the fins 92. Since it is necessary to obtain combustion in the space between the burner wall 98 and the fins 92 which are spaced from the burner wall by a distance on the order of the diameter of the burner wall, port size must be very small to restrict the flame length to a distance substantially less than the spacing between the burner wall and the fins 92. In accordance with this invention, it has been found that, by providing equally spaced ports occupying 15% to 30% of the burner wall area, the jet velocity through the ports may be increased to a point where the flame lifts from the wall surface so that relatively little heat is transferred to the burner wall 98 while adjacent ports provide mutual reignition of each other and, hence, stable burning at high combustion rates.

The large flow of relatively cool fuel-air mixture through the ports cools the burner wall, and combustion of the fuel-air mixture produces relatively little radiant heat and, hence, there is relatively little heating of the burner wall so that nonrefractory metal can be used for the burner wall. Stable firing is enhanced by the curved surface of the burner wall providing for a condition where the flame front extends continuously across the space between adjacent ports and the regions in between the jets produce relatively low velocity regions where the flame can burn in toward the burner wall sufficiently to continuously reignite high speed portions of the jets thereby providing for continuous high combustion of the burner jets.

Uniformity of all jets issuing from the ports is enhanced by the use of an end plate 102 for the burner which is depressed inwardly into the interior of the cylinder of the burner wall 98. Preferably, in order to obtain complete combustion of the fuel-air mixture in the very small combustion volume and to reduce the peak combustion temperature to a temperature below that which produces substantial nitrous oxides and/or carbon monoxide, the air to fuel ratio is between 20% and 30% larger than the stoichiometric mixture.

With the particular burner which can burn at a rate in excess of 20,000 BTU's per hour per square inch of burner wall surface with a sufficiently short flame to provide a combustion in excess of 1,000 BTU's per hour per cubic inch of combustion volume with substantially no pollutants in the flue gas, the heat exchanger 16 comprising the tubes 90 and the fins 92 may be positioned closely around the burner as shown thereby providing a very compact heating unit. Preferably, the fins are sufficiently thick that they provide rigid support between the tubes 90 along their entire length so that the heat exchanger 16 is a rigid structure which will not vibrate when subjected to the high flue gas velocities through the fins 92. In addition, the total surface area of the tubes 90 and the fins 92 is sufficient to extract the major portion of the heat from the flue gas so that the flue gas will have, for example, a temperature of 300° to 400° after passing through heat exchanger 16 and, hence, even through substantial excess air has been used, the overall efficiency of the heat transfer will be in excess of 80% of that available in the fuel. For example, with half inch tubes 90, the fins 92 may have a thickness of between 0.050 inches and 0.130 inches, and the spacing between the fins may be, for example, 0.050 inches. The width of the fin may be, for example, between three quarters of an inch and one inch so that the fin extends beyond the tubes 90 for a distance approximately equal to one-half the spacing between the tubes. For example, twenty tubes 90 having an outside diameter of one-half inch may be positioned with their axes in a circular locus approximately six inches in diameter, and the walls of adjacent tubes 90 will be slightly less than one-half inch apart. It should be clearly understood that the foregoing dimensions are given by way of example only and that any desired dimensions and spacings can be used. While fins 92 are preferably formed of steel and may be brazed to the tubes 90 in a conventional manner by having all the parts precoated with copper and heated to brazing temperature after assembly in a jig, any other method of fabrication, such as casting, can be used.

Referring now to FIG. 3, there is shown a modification of the burner heat exchanger assembly in which a plurality of spheres are used in place of the fins 92, the spheres being assembled between the tubes 90 in a jig and brazed together and to the tubes 90 by individually plating the parts with copper and heating them to brazing temperature in a suitable jig. The diameter of the spheres, which may be, for example, between one-tenth of an inch and one-quarter of an inch, is determined by having sufficient surface area of the spheres to transfer the desired percentage of the heat from the flue gas to the fluid in the tubes 90 for a given firing rate of the burner. If a lower firing rate is to be used, larger spheres may be usefully used, such as quarter inch spheres, while if extremely high firing rates are to be used, spheres of relatively smaller diameter are more desirable, the latter, however, providing passageways between the spheres which more easily plug with particular matter in the flue gas product and which are less easily cleaned. Thus, it may be seen that for high temperature operation, the spacing between adjacent members providing the rigid interconnection of the tubes is preferably selected to produce good heat transfer while not being so close as to create a condition where the heat exchanger becomes readily plugged with contaminants from the flue gas.

Referring now to FIG. 4, there is shown an application of the structure of FIGS. 1 through 3 in a package unit suitable for mounting on a pad behind the house or on the roof of the house. A side cover of the unit has been removed to illustrate the details of the structure. The unitary package comprises a frame 110 having at one end thereof an air intake 112 for connection to return air ducts in a home and an air outlet 114 for supplying heated or cooled air to ducts in the home. Air intake 112 supplies air to the outside of a heat pump evaporating coil 116 in which a working fluid is evaporated after being compressed by a compressor 118 and condensed in a condensing coil 120 at the opposite end of the package 110 from the evaporating coil 116. Heat is rejected from the package by blowing air across the condensing coil 120 with a fan positioned in a shroud 122 behind flue gas heat exchanger burner assembly 10. A blower 74, shown diagrammatically as a fan in FIG. 1, circulates air from the intake air duct 112 across the evaporating coil 116 and the radiator 60 positioned in the air return duct 74, the compartment containing the blower 114 being separated from the compartment containing the heat pump 118 and the heater 10 by a wall 124 and the control of the heat to the radiator 60 being controlled by the thermostatic control valve 70 position in the return line 72 between the radiator 60 and the steam dome 12.

In operation, the heat pump 118 is actuated by a thermostat when a manual switch (not shown) is switched to cool to disable operation of the valve 70 so that the radiator 60 remains filled with liquid and no heat is transferred therethrough by the heater 10. Under such conditions, the thermostat in the home being cooled by the heat pump 118 can have its upper temperature controlled by turning the heat pump 118 on or off in accordance with the temperature. When the manual switch is switched to heat, the thermostat or, if desired, a separate thermostat, will control the operation of the valve 70 to supply heat to the radiator 60 to heat the air space when it falls below a predetermined temperature setting of the thermostat.

This completes the description of the embodiments of the invention illustrated herein. However, many modifications of this invention will be apparent to persons skilled in the art without departing from the spirit and scope of this invention. For example, the hot water heat exchanger 40 may be positioned within the home while still utilizing the heat from the coil 34 via the lines 36 and 38 thereby compensating for any heat lost during extended distances of the hot water piping, and any desired configuration of the package can be used, or the combined water heater and space heater of FIG. 1 may be assembled in the package without the heat pump. Accordingly, it is intended that this invention be not limited by the particular details of the embodiments illustrated herein except as defined by the appended claims.

What is claimed is:

1. In a residential air heating and cooling system comprising:
    first and second regions of said system substantially isolated from each other;
    first heat exchange means positioned in said first region comprising a heat exchanger having a surface for contacting a fluid and a surface for contacting the products of combustion which has a substantially greater area than said surface for contacting said fluid;
    said first heat exchange means comprising a plurality of tubular members providing a conduit for fluid to be heated and having conductive bodies bonded thereto for providing the major portion of said surface contacting said products of combustion;
    means for supplying said fluid from the upper ends of said tubular membrers to a reservoir above said heat exchanger and for supplying fluid as a liquid from said reservoir substantially directly to the lower ends of said tubular members;
    second and third heat exchange means positioned in said second region;
    a fluid circulation system comprising at least a conduit means for said fluid extending between said first and second regions;
    means for supplying thermal energy from the products of combustion to said fluid through said first heat exchange means;
    means for transferring thermal energy as a vapor of said fluid from said first reservoir to said second heat exchange means and back as a condensate to the lower ends of said tubular members through said fluid circulation system;
    means in said second region for circulating air through said second heat exchange means; and
    means for pumping thermal energy from said third heat exchange means to a fourth heat exchange means.

2. The heat transfer system in accordance with claim 1 wherein:
    the surface area of said heat exchanger in contact with said products of combustion comprises a plurality 3. The heat transfer system in accordance with claim 1 wherein:
    said heat exchanger comprises a plurality of finned tubular elements rigidly interconnected by a plurality of solid header members and defining a central plenum.

4. The heat transfer system in accordance with claim 3 wherein:
    said means for providing the products of combustion comprises a burner positioned within said central plenum and supplied with a fuel-air mixture by a blower.

5. In a residential air heating and cooling and water heat system comprising:
    first heat exchange means in a first location, second heat exchange means in a second location, third heat exchange means adjacent said second heat exchange means, fourth heat exchange means above said first heat exchange means, and fifth heat exchange means adjacent said first heat exchange means;
    means connected between said third heat exchange means and said fifth heat exchange means for pumping thermal energy from said third heat exchange means to said fifth heat exchange means;
    said first heat exchange means comprising a plurality of finned substantially vertical tubular elements rigidly interconnected by upper and lower headers and defining a central plenum;
    means for supplying a fluid as a liquid to the lower ends of said tubular elements and for supplying said fluid at least partly as a vapor to a reservoir above said first heat exchange means through portions of said tubular elements extending into said reservoir;
    means comprising a burner positioned in said plenum for supplying thermal energy from the products of combustion to said first heat exchange means;
    conduit means connected between said first heat exchange means and said second heat exchange means for circulating a fluid heated by said products of combustion in said first heat exchange means through said second heat exchange means;
    means for blowing air through said second and third heat exchange means to heat said air when thermal energy is being supplied from said first heat exchange means to said second heat exchange means and to cool said air when thermal energy is being pumped from said third heat exchange means to said fifth heat exchange means; and
    means for supplying thermal energy from said first heat exchange means in said reservoir to said fourth heat exchange means to heat water flowing therethrough.

6. The system in accordance with claim 5 wherein:
    a fan is positioned to circulate air through said fifth heat exchange means when thermal energy is being pumped from said third heat exchange means to said fifth heat exchange means by said thermal energy pumping means.

7. The system in accordance with claim 5 wherein:
    said thermal pumping means comprises a compressor positioned adjacent said first heat exchange means.

* * * * *

UNITED STATES PATENT OFFICE
CERTIFICATE OF CORRECTION

Patent No. 4,158,386    Dated June 19, 1979

Inventor(s) William H. Hapgood

It is certified that error appears in the above-identified patent and that said Letters Patent are hereby corrected as shown below:

Column 8, line 50: change "74" to --114--;

Column 8, line 51: change "114" to --74--;

Column 8, line 54: change "position" to --positioned--;

Column 9, line 63: after "plurality" insert --of fins--;

Column 10, line 2: change "1" to --2--;

Column 10, line 14: change "heat" to --heating--.

Signed and Sealed this

Ninth Day of December 1980

[SEAL]

Attest:

SIDNEY A. DIAMOND

Attesting Officer    Commissioner of Patents and Trademarks